United States Patent
Lin et al.

(10) Patent No.: US 11,954,875 B2
(45) Date of Patent: Apr. 9, 2024

(54) METHOD FOR DETERMINING HEIGHT OF PLANT, ELECTRONIC DEVICE, AND STORAGE MEDIUM

(71) Applicant: HON HAI PRECISION INDUSTRY CO., LTD., New Taipei (TW)

(72) Inventors: Tzu-Chen Lin, New Taipei (TW); Chih-Te Lu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 294 days.

(21) Appl. No.: 17/571,847

(22) Filed: Jan. 10, 2022

(65) Prior Publication Data
US 2022/0222836 A1 Jul. 14, 2022

(30) Foreign Application Priority Data
Jan. 12, 2021 (CN) .......................... 202110037831.6

(51) Int. Cl.
*G06V 10/44* (2022.01)
*G06F 18/213* (2023.01)
(Continued)

(52) U.S. Cl.
CPC .............. *G06T 7/50* (2017.01); *G06F 18/213* (2023.01); *G06T 5/002* (2013.01); *G06T 7/64* (2017.01);
(Continued)

(58) Field of Classification Search
CPC .. G06T 7/50; G06T 5/002; G06T 7/64; G06T 7/70; G06T 7/90; G06T 2207/10024; G06T 2207/30188; G06T 2207/10028; G06T 2207/20081; G06T 2207/20084; G06T 7/0012; G06T 7/12; G06T 7/62; G06T 7/13; G06T 7/181; G06T 2207/20221; G06F 18/213; G06V 10/225; G06V 10/44;
(Continued)

(56) References Cited

U.S. PATENT DOCUMENTS

| | | | |
|---|---|---|---|
| 10,096,154 B2* | 10/2018 | Liu | G06T 7/62 |
| 2021/0125355 A1* | 4/2021 | Mirza | G06Q 20/208 |
| 2022/0383535 A1* | 12/2022 | Su | G06V 10/443 |

FOREIGN PATENT DOCUMENTS

| | | | | |
|---|---|---|---|---|
| CN | 109115776 A | * | 1/2019 | G01B 11/002 |
| CN | 109285145 A | * | 1/2019 | G06T 5/002 |

(Continued)

*Primary Examiner* — Nhan T Tran
(74) *Attorney, Agent, or Firm* — ScienBiziP, P.C.

(57) ABSTRACT

A method for determining a height of a plant, an electronic device, and a storage medium are disclosed. In the method, a target image is obtained by mapping an obtained color image with an obtained depth image. The electronic device processes the color image by using a pre-trained mobilenet-ssd network, obtains a detection box appearance of the plant, and extracts target contours of the plant to be detected from the detection box. The electronic device determines a depth value of each of pixel points in the target contour according to the target image. Target depth values are obtained by performing a de-noising on depth values of the pixel points, and a height of the plant to be detected is determined according to the target depth value. The method improves accuracy of height determination of a plant.

20 Claims, 4 Drawing Sheets

(51) Int. Cl.
| | |
|---|---|
| *G06T 5/00* | (2006.01) |
| *G06T 7/50* | (2017.01) |
| *G06T 7/64* | (2017.01) |
| *G06T 7/70* | (2017.01) |
| *G06T 7/90* | (2017.01) |
| *G06V 10/22* | (2022.01) |
| *G06V 20/10* | (2022.01) |
| *G06V 20/70* | (2022.01) |
| *H04N 23/60* | (2023.01) |

(52) U.S. Cl.
CPC ............... *G06T 7/70* (2017.01); *G06T 7/90* (2017.01); *G06V 10/225* (2022.01); *G06V 10/44* (2022.01); *G06V 20/188* (2022.01); *G06V 20/70* (2022.01); *H04N 23/60* (2023.01); *G06T 2207/10024* (2013.01); *G06T 2207/30188* (2013.01)

(58) Field of Classification Search
CPC ...... G06V 20/188; G06V 20/70; G06V 10/25; G06V 10/26; G06V 10/30; G06V 10/82; G06V 20/647; H04N 23/60; G06N 3/045; G06N 3/08
See application file for complete search history.

(56) References Cited

FOREIGN PATENT DOCUMENTS

| | | | | |
|---|---|---|---|---|
| CN | 109389589 A | | 2/2019 | |
| CN | 109584293 A | * | 4/2019 | ............... G06T 7/60 |
| CN | 112102391 A | | 12/2020 | |

* cited by examiner

METHOD FOR DETERMINING HEIGHT OF PLANT, ELECTRONIC DEVICE, AND STORAGE MEDIUM

FIELD

The present application relates to a technical field of image analysis, and more particularly to a method for determining a height of a plant, an electronic device, and a storage medium.

BACKGROUND

To increase yield and quality of plants, it is helpful to determine a better planting method for plants by analyzing a daily growth of the plants, thereby reducing planting costs. However, when analyzing growth of the plants by using images, some irrelevant information such as leaves, weeds, etc. shown in the image may influence an accuracy of a growth analysis of the plants.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below. Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Figure 1:
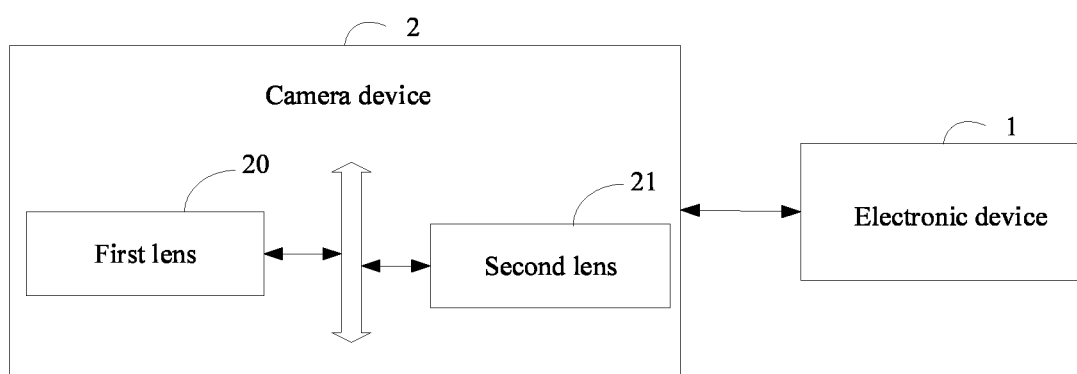
FIG. 1 is a block diagram of a camera device in communication with an electronic device in an embodiment of the present application.

FIG. 1 is a block diagram of a camera device in communication with an electronic device in an embodiment of the present application. As shown in FIG. 1, a camera device 2 communicates with an electronic device 1, and the camera device 2 includes a first lens 20 and a second lens 21. The first lens 20 can capture color images, and the second lens 21 can capture depth images.

Figure 2:
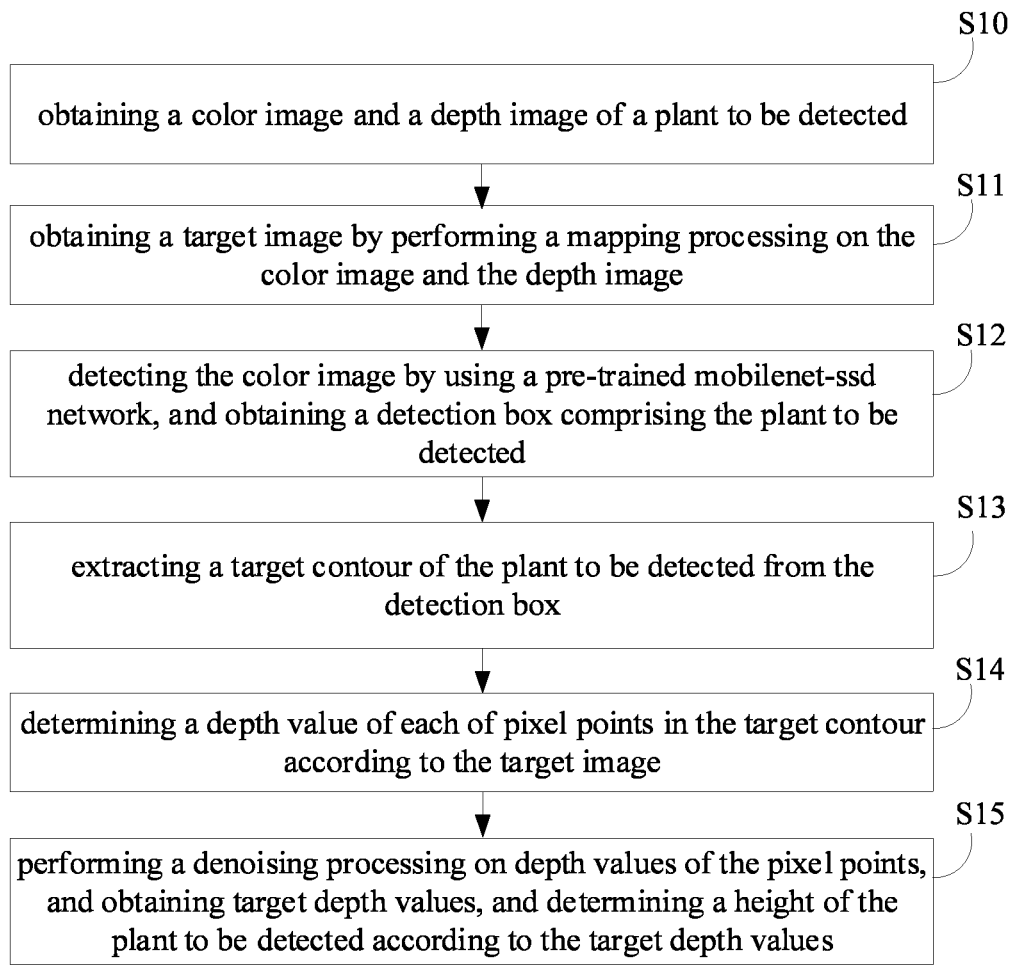
FIG. 2 is a flowchart diagram of a method of determining a height of a plant in an embodiment of the present application.

FIG. 2 is a flowchart diagram of a method for determining a height of a plant in an embodiment of the present application.

In one embodiment, the method for determining a height of a plant may be applied to one or more electronic devices 1. The electronic device 1 includes hardware such as, but is not limited to, a microprocessor and an Application Specific Integrated Circuit (ASIC), a Field-Programmable Gate Array (FPGA), a Digital Signal Processor (DSP), embedded devices, for example.

The electronic device 1 may be any electronic product that can interact with a user, such as a personal computer, a tablet computer, a smart phone, a personal digital assistant (Personal Digital Assistant, PDA), a game console, an interactive network television (Internet Protocol Television, IPTV), or smart wearable device, for example.

The electronic device 1 may also include a network device and/or a user device. The network device includes, but is not limited to, a single network server, a server group including multiple network servers, or a cloud including a large quantity of hosts or network servers based on a cloud computing technology.

A network can include, but is not limited to, the Internet, a wide area network, a metropolitan area network, a local area network, and a virtual private network (VPN), for example.

In block S10, the electronic device 1 obtains a color image and a depth image of a plant to be detected.

In one embodiment, the color image can be a red, green, blue (RGB) three-channel color image, and the depth image can be an image of which pixel values indicate a distance from an image collector to each point in a captured scene.

In one embodiment, the color image and the depth image can be obtained from the camera device 2 or from a configuration library. Moreover, the color image and the depth image both include the plant to be detected.

In one embodiment, the color image and the depth image of the plant to be detected can be obtained by performing a following procedure. The first lens 20 of the camera device 2 is controlled to capture the plant to be detected, and the color image is obtained. Then the second lens 21 of the camera device 2 is also controlled to capture the plant to be detected, and the depth image is obtained.

The camera device 2 includes dual lenses, such as the first lens 20 and the second lens 21 as mentioned above. The camera device 2 may be positioned above the plant to be detected.

Moreover, the plant to be detected may be any plant that needs to be analyzed for daily growth, such as roses, sunflowers, or rice plant, for example.

Specifically, in response that the plant to be detected is directly in front of the camera device 2, the electronic device 1 controls the first lens 20 to shoot the plant to be detected and obtains the color image. The electronic device 1 controls the second lens 21 to shoot the plant to be detected and obtains the depth image.

According to the above embodiments, the color image and the depth image of the plant to be detected can be quickly obtained.

In one embodiment, the electronic device 1 determines a label of the plant to be detected, further, the electronic device 1 obtains an image with the label from the first configuration library as the color image, and the electronic device 1 obtains an image with the label from the second configuration library as the depth image. The label may indicate the plant to be detected, for example, the label may be 0001.

The first configuration library stores a mapping relationship between a plurality of color images and a plurality of labels, and the second configuration library stores a mapping relationship between a plurality of depth images and the plurality of labels.

The color image can be accurately obtained through a mapping relationship between the label and the color image, and then the depth image can be accurately obtained through a mapping relationship between the label and the depth image.

In block S11, the electronic device 1 obtains a target image by performing a mapping processing on the color image and the depth image.

In one embodiment, the target image can be an image generated by merging pixels of the color image with pixels of the depth image.

In one embodiment, the electronic device 1 acquires depth pixel points on the depth image, the electronic device 1 further maps the depth pixel points to a preset depth coordinate system and obtains depth coordinates of the depth pixel points. The electronic device 1 determines global coordinates of the depth pixel points according to the depth coordinates and a preset global coordinate system. Then, the electronic device 1 determines positions of the depth pixel points on the color image according to the global coordinates of the depth pixel points and determines color pixel points corresponding to the positions on the color image. Moreover, the electronic device 1 obtains the target image by merging each of the depth pixel points with corresponding color pixel points.

The preset depth coordinate system and the preset global coordinate system can be obtained from an open source system or can be preset by a user according to the actual requirements, not being limited in the present application.

According to the above embodiment, the generation of a target image that includes a depth value is helpful for a subsequent determination of a growth height of the plant to be detected.

In block S12, the electronic device 1 detects the color image by using a pre-trained mobilenet-ssd network and obtains a detection box in which the plant to be detected.

In one embodiment, the detection box is obtained by using a convolution check in the mobilenet-ssd network and features of the color image are extracted.

In one embodiment, before the electronic device 1 detects the color image by using a pre-trained mobilenet-ssd network, the electronic device 1 obtains a detection box including the plant to be detected, a field that the plant to be detected can be determined. A plurality of color training images is obtained in the field. The electronic device 1 fuses the plurality of color training images and obtains a data set. The data set is divided into a training set and a verification set. Further, a learner is obtained by training an open-source convolution network using color training images in the training set. The pre-trained mobilenet-ssd network is obtained by adjusting the learner using color training images in the verification set.

In one embodiment, before the data set is divided into a training set and a verification set, a number of color training images in the data set are calculated, and the number of color training images in the data set are increased by using a data enhancement algorithm in response that the number of color training images is less than a preset number.

According to the above embodiments, the risk of poor generalization of the pre-trained mobilenet-ssd network is thereby avoided.

In one embodiment, the data set is randomly divided into at least one data packet according to a preset ratio. Any one of the at least one data packet can be determined as the verification set, and the remaining data packets are determined to be the training set. The above embodiments can be repeated until one of the at least one data packet is determined as the verification set.

The preset ratio can be customized, and the preset ratio is not limited.

According to the above embodiments, each of the color training images in the training data is involved in training and verification procedures, thereby improving the pre-training of the pre-trained mobilenet-ssd network.

In one embodiment, the electronic device 1 determines an optimized hyperparameter point from the verification set by performing a hyperparameter grid search method. Moreover, the electronic device 1 adjusts the learner according to the optimized hyperparameter point and obtains the pre-trained mobilenet-ssd network.

Specifically, the electronic device 1 splits the verification set according to a preset step size and obtains a target subset. The electronic device 1 traverses parameters of two ends on the target subset, verifies the learner by using the parameters of the two ends on the target subset, and obtains a learning rate of each of the parameters. The electronic device 1 determines a parameter in the neighborhood of the first hyperparameter point with the largest learning rate as a first hyperparameter point. The electronic device 1 reduces the preset step size and continues traversing until the length of a step size after reduction is equal to a preset step length, and determines a hyperparameter point as being the optimized hyperparameter point. Furthermore, the electronic device 1 adjusts the learner according to the optimized hyperparameter point, and obtains the pre-trained mobilenet-ssd network.

The preset step length is not limited.

The pre-trained mobilenet-ssd network is more effective in analyzing the color image.

In one embodiment, a depth convolution kernel and a point convolution kernel are acquired in the pre-trained mobilenet-ssd network. A feature map is obtained by extracting features of the color image with the depth convolution kernel, and the detection box is obtained by processing the feature map with the point convolution kernel.

The depth convolution kernel may be a 16*16*128 matrix, and the point convolution kernel may be a 1*1*16 matrix.

The detection box can be detected quickly through the pre-trained mobilenet-ssd network, and the detection efficiency can be improved.

In block S13, the electronic device 1 extracts a target contour of the plant to be detected from the detection box.

In one embodiment, the target contour of the plant to be detected refers to a contour after removing irrelevant information in the detection box, and the shape of the target contour is determined according to the shape of the plant to be detected.

In one embodiment, a background image is deleted from the detection box, and a grayscale image is obtained. The target contour of the plant to be detected is detected on the grayscale image.

By deleting the background image, interference caused by the background image can be avoided, and the accuracy of extracting the target contour can be improved.

In block S14, the electronic device 1 determines a depth value of each of pixel point in the target contour according to the target image.

In one embodiment, the depth value refers to a height of a feature point from the camera device 2. The feature point can be a pixel corresponding to the depth image of the plant to be detected.

In one embodiment, the electronic device 1 determines a target position of each of the pixel points on the target image, and the electronic device 1 obtains a depth value at the target position from the target image as the depth value of each of the pixel points.

By determining the depth value of each of pixel points in the target contour according to the target image, the depth value of each of pixel points can be accurately and quickly determined.

In block S15, the electronic device 1 performs a denoising processing on depth values of the pixel points, and obtains target depth values, and determines a height of the plant to be detected according to the target depth values.

In one embodiment, a depth value is determined as a zero value, the determined depth value is equal to a preset value, the electronic device 1 performs a de-noising processing by deleting the zero value from the depth values of the pixel points, and remaining depth values are determined as the target depth values. A number of target depth values are determined, and a sum is obtained by counting the target depth values. A distance is calculated between the plant to be detected and the camera device by dividing the sum by the number of the target depth values. The electronic device 1 determines a height of a location where the camera device is located, and the electronic device 1 determines the height of the plant to be detected by subtracting the distance from the height of the camera device.

By performs a de-noising processing on depth values of the pixel points, and target depth values are obtained, it can be ensured that there is no irrelevant information in the target depth values, and the height of the plant to be detected can be accurately determined according to the target depth values.

In one embodiment, in response that the height of the plant to be detected is less than a preset height, warning information is generated according to the height of the plant to be detected. The warning information is encrypted by using a symmetric encryption algorithm and a cipher text is obtained, an alarm level of the cipher text is determined according to the plant to be detected. Then an alarm mode is determined according to the alarm level of the cipher text, and the cipher text is sent by the alarm mode.

The preset height can be set according to an expected growth rate of the plant to be detected, the above embodiments do not limit the value of the preset height. The alarm level includes level one, level two, and so on. The alarm mode includes an audio alarm using a loudspeaker, an email mode, and a telephone mode, for example.

According to the above embodiments, in response that the height of the plant to be detected is less than the preset height, the warning information can be issued. In addition, the warning information can be protected against tampering by encrypting the warning information, and security of the warning information can be improved. Moreover, the warning information can be sent in an appropriate alarm mode by determining the alarm mode according to the alarm level. Thus, the warning information can be output in a more user-friendly way.

In the above embodiments, by performing a mapping processing on the color image and the depth image, thereby obtaining the target image including the depth value, and then the detection box can be quickly detected through the pre-trained mobilenet-ssd network, the detection efficiency can be improved, the target contours of the plant to be detected can be extracted from the detection box, and the target contours minus irrelevant information can be extracted. By determining the depth value of each of pixel points in the target contour according to the target image, the depth value of each of pixel points can be accurately and quickly determined, and then the target depth value can be obtained by performing a de-noising processing on depth values of the pixel points, which can ensure that there is no irrelevant information in the target depth values again. The height of the plant to be detected can be accurately determined according to the target depth values.

Figure 3:
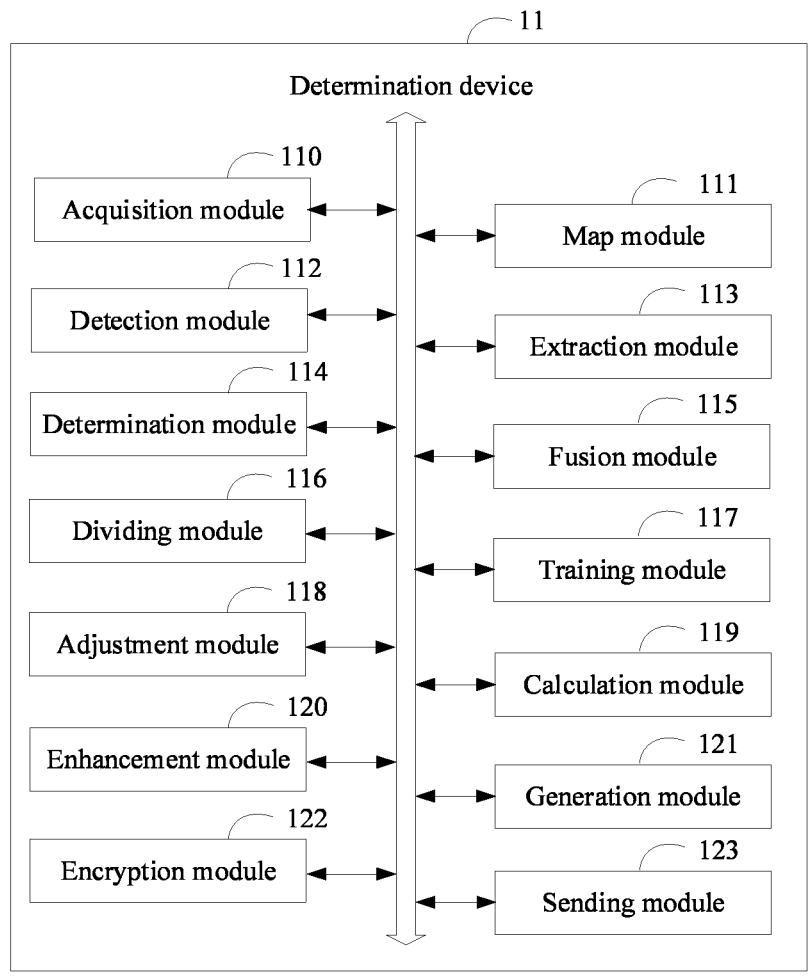
FIG. 3 is a structural diagram of a determination device for determining a height of a plant in an embodiment of the present application.

FIG. 3 is a structural diagram of a determination device for determining a height of a plant in an embodiment of the present application.

As shown in FIG. 3, a determination device 11 for determining a height of a plant includes an acquisition module 110, a map module 111, a detection module 112, an extraction module 113, a determination module 114, a fusion module 115, a dividing module 116, a training module 117, an adjustment module 118, a calculation module 119, an enhancement module 120, a generation module 121, an encryption module 122, and a sending module 123. The modules in the present application refer to one of a stored series of computer-readable instruction segments that can be executed by at least one processor and that are capable of performing preset functions. In some embodiments, the functions of each module will be described.

The acquisition module 110 obtains a color image and a depth image of a plant to be detected.

In one embodiment, the color image can be a red, green, blue (RGB) three-channel color image, and the depth image can be an image of which pixel values indicate a distance from an image collector to each point in a captured scene.

In one embodiment, the color image and the depth image can be obtained from the camera device 2 or from a configuration library. The color image and the depth image both include the plant to be detected.

In one embodiment, the color image and the depth image of the plant to be detected can be obtained by performing a following procedure. The first lens 20 of the camera device 2 is controlled to capture the plant to be detected, and the color image is obtained. Then the second lens 21 of the camera device 2 is also controlled to capture the plant to be detected, and the depth image is obtained.

The camera device 2 includes dual lenses, such as the first lens 20 and the second lens 21 as mentioned above. The camera device 2 may be positioned above the plant to be detected.

Moreover, the plant to be detected may be any plant that needs to be analyzed for daily growth, such as roses, sunflowers, or rice plant, for example.

Specifically, in response that the plant to be detected is directly in front of the camera device 2, the acquisition module 110 controls the first lens 20 to shoot the plant to be detected and obtains the color image. The acquisition module 110 controls the second lens 21 to shoot the plant to be detected and obtains the depth image.

According to the above embodiments, the color image and the depth image of the plant to be detected can be quickly obtained.

In one embodiment, the acquisition module 110 determines a label of the plant to be detected, further, the acquisition module 110 obtains an image with the label from the first configuration library as the color image, and the acquisition module 110 obtains an image with the label from the second configuration library as the depth image. The label may indicate the plant to be detected, for example, the label may be 0001.

The first configuration library stores a mapping relationship between a plurality of color images and a plurality of labels, and the second configuration library stores a mapping relationship between a plurality of depth images and the plurality of labels.

The color image can be accurately obtained through a mapping relationship between the label and the color image, and then the depth image can be accurately obtained through a mapping relationship between the label and the depth image.

The map module 111 obtains a target image by performing a mapping processing on the color image and the depth image.

In one embodiment, the target image can be an image generated by merging pixels of the color image with pixels of the depth image.

In one embodiment, the map module 111 acquires depth pixel points on the depth image, the map module 111 further maps the depth pixel points to a preset depth coordinate system and obtains depth coordinates of the depth pixel points. The map module 111 determines global coordinates of the depth pixel points according to the depth coordinates and a preset global coordinate system. Then, the map module 111 determines positions of the depth pixel points on the color image according to the global coordinates of the depth pixel points and determines color pixel points corresponding to the positions on the color image. Moreover, the map module 111 obtains the target image by merging each of the depth pixel points with corresponding color pixel points.

The preset depth coordinate system and the preset global coordinate system can be obtained from an open source system or can be preset by a user according to the actual requirements, not being limited in the present application.

According to the above embodiment, the generation of a target image that includes a depth value is helpful for a subsequent determination of a growth height of the plant to be detected.

The detection module 112 detects the color image by using a pre-trained mobilenet-ssd network, and obtains a detection box in which the plant to be detected.

In one embodiment, the detection box is obtained by using a convolution check in the mobilenet-ssd network and features of the color image are extracted.

In one embodiment, before the detection module 112 detects the color image by using a pre-trained mobilenet-ssd network, and obtains a detection box including the plant to be detected, a field that the plant to be detected can be determined by a determination module 114. A plurality of color training images are obtained in the field. The fusion module 115 fuses the plurality of color training images and obtains a data set. The data set is divided into a training set and a verification set by the dividing module 116. Further, a learner is obtained by the training module 117 training an open-source convolution network using color training images in the training set. The pre-trained mobilenet-ssd network is obtained by the adjustment module 118 adjusting the learner using color training images in the verification set.

In one embodiment, before the data set is divided into a training set and a verification set, a number of color training images in the data set are calculated, and the number of color training images in the data set are increased by using a data enhancement algorithm in response that the number of color training images is less than a preset number.

According to the above embodiments, the risk of poor generalization of the pre-trained mobilenet-ssd network is thereby avoided.

In one embodiment, the data set is randomly divided into at least one data packet according to a preset ratio. Any one of the at least one data packet can be determined as the verification set, and the remaining data packets are determined to be the training set. The above embodiments can be repeated until one of the at least one data packet is determined as the verification set.

The preset ratio can be customized, and the preset ratio is not limited.

According to the above embodiments, each of the color training images in the training data is involved in training and verification procedures, thereby improving the pre-training of the pre-trained mobilenet-ssd network.

In one embodiment, the adjustment module 118 determines an optimized hyperparameter point from the verification set by performing a hyperparameter grid search method. Moreover, the adjustment module 118 adjusts the learner according to the optimized hyperparameter point and obtains the pre-trained mobilenet-ssd network.

Specifically, the adjustment module 118 splits the verification set according to a preset step size and obtains a target subset. The adjustment module 118 traverses parameters of two ends on the target subset, verifies the learner by using the parameters of the two ends on the target subset, and obtains a learning rate of each of the parameters. The adjustment module 118 determines a parameter in the neighborhood of the first hyperparameter point with the largest learning rate as a first hyperparameter point. The adjustment module 118 reduces the preset step size and continues traversing until the length of a step size after reduction is equal to a preset step length, and determines a hyperparameter point as being the optimized hyperparameter point. Furthermore, the adjustment module 118 adjusts the learner according to the optimized hyperparameter point and obtains the pre-trained mobilenet-ssd network.

The preset step length is not limited.

The pre-trained mobilenet-ssd network is more effective in analyzing the color image.

In one embodiment, a depth convolution kernel and a point convolution kernel are acquired in the pre-trained mobilenet-ssd network. A feature map is obtained by extracting features of the color image with the depth convolution kernel, and the detection box is obtained by processing the feature map with the point convolution kernel.

The depth convolution kernel may be a 16*16*128 matrix, and the point convolution kernel may be a 1*1*16 matrix.

The detection box can be detected quickly through the pre-trained mobilenet-ssd network, and the detection efficiency can be improved.

The extraction module 113 extracts a target contour of the plant to be detected from the detection box.

In one embodiment, the target contour of the plant to be detected refers to a contour after removing irrelevant information in the detection box, and the shape of the target contour is determined according to the shape of the plant to be detected.

In one embodiment, a background image is deleted from the detection box, and a grayscale image is obtained. The target contour of the plant to be detected is detected on the grayscale image.

By deleting the background image, interference caused by the background image can be avoided, and the accuracy of extracting the target contour can be improved.

The determination module 114 determines a depth value of each of pixel points in the target contour according to the target image.

In one embodiment, the depth value refers to a height of a feature point from the camera device 2. The feature point can be a pixel corresponding to the depth image of the plant to be detected.

In one embodiment, the determination module 114 determines a target position of each of the pixel points on the target image, and the determination module 114 obtains a depth value at the target position from the target image as the depth value of each of the pixel points.

By determining the depth value of each of pixel points in the target contour according to the target image, the depth value of each of pixel points can be accurately and quickly determined.

The determination module 114 performs a de-noising processing on depth values of the pixel points, and obtains target depth values, and determines a height of the plant to be detected according to the target depth values.

In one embodiment, a depth value is determined as a zero value, the determined depth value is equal to a preset value, the determination module 114 performs a de-noising processing by deleting the zero value from the depth values of the pixel points, and remaining depth values are determined as the target depth values. A number of the target depth values are determined, and a sum is obtained by counting the target depth values. A distance is calculated between the plant to be detected and the camera device by dividing the sum by the number of the target depth values. The determination module 114 determines a height of a location where the camera device is located, and the determination module 114 determines the height of the plant to be detected by subtracting the distance from the height of the camera device.

By performs a de-noising processing on depth values of the pixel points, and target depth values are obtained, it can be ensured that there is no irrelevant information in the target depth values, and the height of the plant to be detected can be accurately determined according to the target depth values.

In one embodiment, in response that the height of the plant to be detected is less than a preset height, warning information is generated according to the height of the plant to be detected. The warning information is encrypted by using a symmetric encryption algorithm and a cipher text is obtained, an alarm level of the cipher text is determined according to the plant to be detected. Then an alarm mode is determined according to the alarm level of the cipher text, and the cipher text is sent by the alarm mode.

The preset height can be set according to an expected growth rate of the plant to be detected, the above embodiments do not limit the value of the preset height. The alarm level includes level one, level two, and so on. The alarm mode includes an audio alarm using a loudspeaker, an email mode, and a telephone mode, for example.

According to the above embodiments, in response that the height of the plant to be detected is less than the preset height, the warning information can be issued. In addition, the warning information can be protected against tampering by encrypting the warning information, and security of the warning information can be improved. Moreover, the warning information can be sent in an appropriate alarm mode by determining the alarm mode according to the alarm level. Thus, the warning information can be output in a more user-friendly way.

In the above embodiments, by performing a mapping processing on the color image and the depth image, thereby obtaining the target image including the depth value, and then the detection box can be quickly detected through the pre-trained mobilenet-ssd network, the detection efficiency can be improved, the target contours of the plant to be detected can be extracted from the detection box, and the target contours minus irrelevant information can be extracted. By determining the depth value of each of pixel points in the target contour according to the target image, the depth value of each of pixel points can be accurately and quickly determined, and then the target depth value can be obtained by performing a de-noising processing on depth values of the pixel points, which can ensure that there is no irrelevant information in the target depth values again. The height of the plant to be detected can be accurately determined according to the target depth values.

Figure 4:
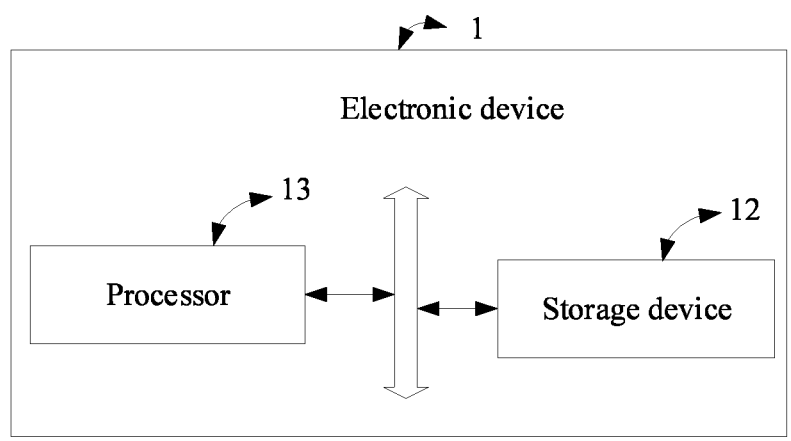
FIG. 4 is a structural diagram of an electronic device in an embodiment of the present application.

FIG. 4 is a structural diagram of an electronic device in an embodiment of the present application. The electronic device 1 may include a storage device 12, at least one processor 13, and computer-readable instructions stored in the storage device 12 and executable by the at least one processor 13, for example, a growth height of a plant determination programs.

Those skilled in the art will understand that FIG. 4 is only an example of the electronic device 1 and does not constitute a limitation on the electronic device 1. Another electronic device 1 may include more or fewer components than shown in the figures or may combine some components or have different components. For example, the electronic device 1 may further include an input/output device, a network access device, a bus, and the like.

The at least one processor 13 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 13 can be a microprocessor or any conventional processor. The processor 13 is a control center of the electronic device 1 and connects various parts of the entire electronic device 1 by using various interfaces and lines.

The processor 13 executes the computer-readable instructions to implement the method for determining a growth height of a plant as mentioned in the above embodiments, such as in block S10-S15 shown in FIG. 2. Alternatively, the processor 13 executes the computer-readable instructions to implement the functions of the modules/units in the foregoing device embodiments, such as the modules 110-123 in FIG. 3.

For example, the computer-readable instructions can be divided into one or more modules/units, and the one or more modules/units are stored in the storage device 12 and executed by the at least one processor 13. The one or more modules/units can be a series of computer-readable instruction segments capable of performing specific functions, and the instruction segments are used to describe execution processes of the computer-readable instructions in the electronic device 1. For example, the computer-readable instruction can be divided into the acquisition module 110, the map module 111, the detection module 112, the extraction module 113, the determination module 114, the fusion module 115, the dividing module 116, the training module 117, the adjustment module 118, the calculation module 119, the enhancement module 120, the generation module 121, the encryption module 122, and the sending module 123 as shown in FIG. 3.

The storage device 12 can be configured to store the computer-readable instructions and/or modules/units. The processor 13 may run or execute the computer-readable instructions and/or modules/units stored in the storage device 12 and may call up data stored in the storage device 12 to implement various functions of the electronic device 1. The storage device 12 mainly includes a storage program area and a storage data area. The storage program area may store an operating system, and an application program required for at least one function (such as a sound playback function, an image playback function, for example), for example. The storage data area may store data (such as audio data, phone book data, for example) created according to the use of the electronic device 1. In addition, the storage device 12 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The storage device 12 may be an external memory and/or an internal memory of the electronic device 1. The storage device 12 may be a memory in a physical form, such as a memory stick, a Trans-flash Card (TF card), for example.

When the modules/units integrated into the electronic device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

With reference to FIG. 2, the storage device 12 in the electronic device 1 stores a plurality of instructions to implement a method for measuring a growth height of a plant, and the processor 13 can execute the multiple instructions to: obtain a color image and a depth image of a plant to be detected; obtain a target image by performing a mapping processing on the color image and the depth image; detect the color image by using a pre-trained mobilenet-ssd network, and obtain a detection box comprising the plant to be detected; extract a target contour of the plant to be detected from the detection box; determine a depth value of each of pixel points in the target contour according to the target image; and perform a denoising processing on depth values of the pixel points, and obtain target depth values, and determine a height of the plant to be detected according to the target depth values.

The computer-readable instructions are executed by the processor 13 to realize the functions of each module/unit in the above-mentioned device embodiments, which will not be repeated here.

In the several embodiments provided in the preset application, the disclosed electronic device and method can be implemented in other ways. For example, the embodiments of the devices described above are merely illustrative. For example, divisions of the modules are based on logical function only, and there can be other manners of division in actual implementation.

In addition, each functional module in each embodiment of the present disclosure can be integrated into one processing module, or can be physically present separately in each unit or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Moreover, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method for determining a height of a plant, the method comprising:
obtaining a color image and a depth image of a plant to be detected;
obtaining a target image by performing a mapping processing on the color image and the depth image;
detecting the color image by using a pre-trained mobilenet-ssd network, and obtaining a detection box comprising the plant to be detected;
extracting a target contour of the plant to be detected from the detection box;
determining a depth value of each of pixel points in the target contour according to the target image; and
performing a denoising processing on depth values of the pixel points, obtaining target depth values, and determining a height of the plant to be detected according to the target depth values.

2. The method for determining a height of a plant of claim 1, wherein obtaining a color image and a depth image of a plant to be detected comprises at least one of the following:
controlling a first lens of a camera device to capture the plant to be detected, obtaining the color image, and controlling a second lens of the camera device to capture the plant to be detected, and obtaining the depth image; or
determining a label of the plant to be detected, obtaining an image corresponding to the label from a first configuration library as the color image, and obtaining an image corresponding to the label from a second configuration library as the depth image.

3. The method for determining a height of a plant of claim 2, wherein performing the denoising processing on the depth values of the pixel points, obtaining the target depth values, and determining the height of the plant to be detected according to the target depth values comprises:
  determining a depth value as a zero value, the determined depth value being equal to a preset value;
  performing the denoising processing by deleting the zero value from the depth values of the pixel points, and determining remaining depth values as the target depth values;
  determining a number of the target depth values;
  obtaining a sum by counting the target depth values;
  calculating a distance between the plant to be detected and the camera device by dividing the sum by the number of the target depth values;
  determining a height of a location where the camera device is located; and
  determining the height of the plant to be detected by subtracting the distance from the height of the camera device.

4. The method for determining a height of a plant of claim 1, wherein obtaining the target image by performing the mapping processing on the color image and the depth image comprises:
  acquiring depth pixel points on the depth image;
  mapping the depth pixel points to a preset depth coordinate system, and obtaining depth coordinates of the depth pixel points;
  determining global coordinates of the depth pixel points according to the depth coordinates and a preset global coordinate system;
  determining positions of the depth pixel points on the color image according to the global coordinates of the depth pixel points, and determining color pixel points corresponding to the positions on the color image; and
  obtaining the target image by merging each of the depth pixel points with corresponding color pixel points.

5. The method for determining a height of a plant of claim 1, wherein detecting the color image by using the pre-trained mobilenet-ssd network, and obtaining the detection box comprising the plant to be detected comprises:
  acquiring a depth convolution kernel and a point convolution kernel in the mobilenet-ssd network;
  extracting features of the color image with the depth convolution kernel, and obtaining a feature map; and
  processing the feature map with the point convolution kernel and obtaining the detection box.

6. The method for determining a height of a plant of claim 1, wherein extracting the target contour of the plant to be detected from the detection box comprises:
  deleting a background image from the detection box, and obtaining a grayscale image; and
  detecting the target contour of the plant to be detected on the grayscale image.

7. The method for determining a height of a plant of claim 1, wherein determining the depth value of each of the pixel points in the target contour according to the target image comprises:
  determining a target position of each of the pixel points on the target image; and
  obtaining a depth value at the target position from the target image as the depth value of each of the pixel points.

8. An electronic device comprising:
  a processor; and
  a storage device storing a plurality of instructions, which when executed by the processor, cause the processor to:
    obtain a color image and a depth image of a plant to be detected;
    obtain a target image by performing a mapping processing on the color image and the depth image;
    detect the color image by using a pre-trained mobilenet-ssd network, and obtain a detection box comprising the plant to be detected;
    extract a target contour of the plant to be detected from the detection box;
    determine a depth value of each of pixel points in the target contour according to the target image; and
    perform a denoising processing on depth values of the pixel points, obtain target depth values, and determine a height of the plant to be detected according to the target depth values.

9. The electronic device of claim 8, wherein the processor is further caused to perform at least one of the following:
  control a first lens of a camera device to capture the plant to be detected, obtain the color image, and control a second lens of the camera device to capture the plant to be detected, and obtain the depth image; or
  determine a label of the plant to be detected, obtain an image corresponding to the label from a first configuration library as the color image, and obtain an image corresponding to the label from a second configuration library as the depth image.

10. The electronic device of claim 9, wherein the processor is further caused to:
  determine a depth value as a zero value, the determined depth value being equal to a preset value;
  perform the denoising processing by deleting the zero value from the depth values of the pixel points, and determine remaining depth values as the target depth values;
  determine a number of the target depth values;
  obtain a sum by counting the target depth values;
  calculate a distance between the plant to be detected and the camera device by dividing the sum by the number of the target depth values;
  determine a height of a location where the camera device is located; and
  determine the height of the plant to be detected by subtracting the distance from the height of the camera device.

11. The electronic device of claim 8, wherein the processor is further caused to:
  acquire depth pixel points on the depth image;
  map the depth pixel points to a preset depth coordinate system, and obtain depth coordinates of the depth pixel points;
  determine global coordinates of the depth pixel points according to the depth coordinates and a preset global coordinate system;
  determine positions of the depth pixel points on the color image according to the global coordinates of the depth pixel points, and determine color pixel points corresponding to the positions on the color image; and
  obtain the target image by merging each of the depth pixel points with corresponding color pixel points.

12. The electronic device of claim 8, wherein the processor is further caused to:
  acquire a depth convolution kernel and a point convolution kernel in the mobilenet-ssd network;
  extract features of the color image with the depth convolution kernel, and obtain a feature map; and
  process the feature map with the point convolution kernel, and obtain the detection box.

13. The electronic device of claim 8, wherein the processor is further caused to:
   delete a background image from the detection box, and obtain a grayscale image; and
   detect the target contour of the plant to be detected on the grayscale image.

14. The electronic device of claim 8, wherein the processor is further caused to:
   determine a target position of each of the pixel points on the target image; and
   obtain a depth value at the target position from the target image as the depth value of each of the pixel points.

15. A non-transitory storage medium having stored thereon at least one computer-readable instructions that, when executed by a processor of an electronic device, causes the processor to perform a method for determining a height of a plant, the method comprising:
   obtaining a color image and a depth image of a plant to be detected;
   obtaining a target image by performing a mapping processing on the color image and the depth image;
   detecting the color image by using a pre-trained mobilenet-ssd network, and obtaining a detection box comprising the plant to be detected;
   extracting a target contour of the plant to be detected from the detection box;
   determining a depth value of each of pixel points in the target contour according to the target image; and
   performing a denoising processing on depth values of the pixel points, obtaining target depth values, and determining a height of the plant to be detected according to the target depth values.

16. The non-transitory storage medium of claim 15, wherein obtaining a color image and a depth image of a plant to be detected comprises at least one of the following:
   controlling a first lens of a camera device to capture the plant to be detected, obtaining the color image, and controlling a second lens of the camera device to capture the plant to be detected, and obtaining the depth image; or
   determining a label of the plant to be detected, obtaining an image corresponding to the label from a first configuration library as the color image, and obtaining an image corresponding to the label from a second configuration library as the depth image.

17. The non-transitory storage medium of claim 16, wherein performing the denoising processing on the depth values of the pixel points, obtaining the target depth values, and determining the height of the plant to be detected according to the target depth values comprises:
   determining a depth value as a zero value, the determined depth value being equal to a preset value;
   performing the denoising processing by deleting the zero value from the depth values of the pixel points, and determining remaining depth values as the target depth values;
   determining a number of the target depth values;
   obtaining a sum by counting the target depth values;
   calculating a distance between the plant to be detected and the camera device by dividing the sum by the number of the target depth values;
   determining a height of a location where the camera device is located; and
   determining the height of the plant to be detected by subtracting the distance from the height of the camera device.

18. The non-transitory storage medium of claim 15, wherein obtaining the target image by performing the mapping processing on the color image and the depth image comprises:
   acquiring depth pixel points on the depth image;
   mapping the depth pixel points to a preset depth coordinate system, and obtaining depth coordinates of the depth pixel points;
   determining global coordinates of the depth pixel points according to the depth coordinates and a preset global coordinate system;
   determining positions of the depth pixel points on the color image according to the global coordinates of the depth pixel points, and determining color pixel points corresponding to the positions on the color image; and
   obtaining the target image by merging each of the depth pixel points with corresponding color pixel points.

19. The non-transitory storage medium of claim 15, wherein detecting the color image by using the pre-trained mobilenet-ssd network, and obtaining the detection box comprising the plant to be detected comprises:
   acquiring a depth convolution kernel and a point convolution kernel in the mobilenet-ssd network;
   extracting features of the color image with the depth convolution kernel, and obtaining a feature map; and
   processing the feature map with the point convolution kernel, and obtaining the detection box.

20. The non-transitory storage medium of claim 15, wherein extracting the target contour of the plant to be detected from the detection box comprises:
   deleting a background image from the detection box, and obtaining a grayscale image; and
   detecting the target contour of the plant to be detected on the grayscale image.

* * * * *